(12) United States Patent
Wu

(10) Patent No.: US 11,506,833 B2
(45) Date of Patent: Nov. 22, 2022

(54) ELECTRONIC DEVICE

(71) Applicants: Hefei BOE Vision-Electronic Technology Co.,Ltd., Anhui (CN); BOE TECHNOLOGY GROUP CO., LTD., Beijing (CN)

(72) Inventor: Chao Wu, Beijing (CN)

(73) Assignees: Hefei BOE Vision-Electronic Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/330,542

(22) Filed: May 26, 2021

(65) Prior Publication Data

US 2022/0137284 A1 May 5, 2022

(30) Foreign Application Priority Data

Oct. 30, 2020 (CN) .......................... 202022468651.7

(51) Int. Cl.
*F21V 8/00* (2006.01)
*F21V 15/01* (2006.01)

(52) U.S. Cl.
CPC ............ *G02B 6/0073* (2013.01); *F21V 15/01* (2013.01)

(58) Field of Classification Search
CPC .. G02B 6/0073; G02B 6/0068; G02B 6/0055; F21V 15/01
See application file for complete search history.

(56) References Cited

U.S. PATENT DOCUMENTS

| 10,416,375 B1* | 9/2019 | Lin | G02B 6/0061 |
|---|---|---|---|
| 2011/0134359 A1* | 6/2011 | An | G02F 1/133308 |
| | | | 349/61 |
| 2012/0098651 A1* | 4/2012 | Ramones | H04L 12/4625 |
| | | | 340/332 |
| 2016/0025328 A1* | 1/2016 | Ikeda | F21V 33/0092 |
| | | | 362/96 |

* cited by examiner

*Primary Examiner* — Andrew J Coughlin
*Assistant Examiner* — Jessica M Apenteng
(74) *Attorney, Agent, or Firm* — Houtteman Law LLC

(57) ABSTRACT

The present disclosure provides an electronic device including: a casing, a main body of which is provided with a light transmitting area; an indicating structure including a light emitting component and a light guide component which are fixedly coupled; the light guide component is configured to scatter the light emitted by the light emitting component and then emit the scattered light; the indicating structure is fixedly coupled to the casing, and a light exiting surface of the indicating structure corresponds to the light transmitting area.

11 Claims, 4 Drawing Sheets

ELECTRONIC DEVICE

CROSS-REFERENCE TO RELATED APPLICATIONS

The present application claims the priority of Chinese Patent Application No. 202022468651.7, filed on Oct. 30, 2020, the contents of which are incorporated herein in their entirety by reference.

TECHNICAL FIELD

The present disclosure relates to the field of display technology, and particularly relates to an electronic device.

BACKGROUND

An indicator light is a special component in an electronic device, can indicate various states of the electronic device, such as an operating state, a standby state and the like, for a user, and plays a certain functional role. At present, indicator lights are widely used on display devices such as televisions, computers and the like to indicate operating states. The indicator light is generally made of a light emitting diode (LED).

SUMMARY

An embodiment of the present disclosure provides an electronic device, including:

a casing, a main body of which is provided with a light transmitting area;

an indicating structure including a light emitting component and a light guide component which are fixedly coupled to each other; the light guide component is configured to scatter and emit light emitted by the light emitting component;

the indicating structure is fixedly coupled to the casing, and a light exiting surface of the indicating structure corresponds to the light transmitting area.

In some implementations, the light guide component has a light incident surface and a light exiting surface; a light mixing region is arranged between the light incident surface of the light guide component and the light emitting component; the light emitted by the light emitting component is incident into the light incident surface of the light guide component through the light mixing region and is emitted from the light exiting surface.

In some implementations, the light guide component includes:

a light guide plate provided with the light incident surface and the light exiting surface, and the light incident surface is not adjacent to the light exiting surface; the light emitted by the light emitting component is incident through the light incident surface of the light guide plate and is emitted from the light exiting surface;

a coupling piece fixedly coupled to the light guide plate; the light emitting component is coupled to the coupling piece.

In some implementations, the coupling piece includes a cylindrical structure having a first opening and a second opening;

the light guide plate is embedded in the coupling piece, the light incident surface of the light guide plate is exposed by the first opening, and the light exiting surface of the light guide plate is exposed by the second opening;

an end of the coupling piece where the first opening is located is fixedly coupled to the light emitting component; the light emitted by the light emitting component is incident into the light incident surface of the light guide plate through the first opening;

an end of the coupling piece where the second opening is located is fixedly coupled to the casing, and the second opening is correspondingly coupled to the light transmitting area.

In some implementations, the light incident surface of the light guide plate includes a concave arc surface; and a space is formed between the light emitting component and at least part of the light incident surface of the light guide plate.

In some implementations, the light guide plate has a bent structure, and the light guide plate includes a first light guide part, a second light guide part, and a coupling part configured to couple the first light guide part to the second light guide part; the light emitted from the light emitting component is incident into the coupling part through the first light guide part, is totally reflected by the coupling part, then is incident into the second light guide part, and is emitted from the second light guide part.

In some implementations, the light guide plate includes a transparent light guide plate; and a material of the coupling piece includes a light shielding material.

In some implementations, the light emitting component includes a supporting substrate and a light emitting element; the light emitting element is fixedly arranged on a surface of the supporting substrate proximal to the light guide component.

In some implementations, the light emitting component is fixedly coupled to the light guide component through a coupling bracket;

the coupling bracket includes a first coupling plate, the first coupling plate is provided with a coupling opening, and the coupling opening corresponds to the light incident surface of the light guide component;

the supporting substrate of the light emitting component is fixedly coupled to the first coupling plate, and an orthographic projection of the light emitting element on the supporting substrate falls into an orthographic projection of the coupling opening on the supporting substrate;

an orthographic projection of the light incident surface of the light guide component on the supporting substrate covers the orthographic projection of the coupling opening on the supporting substrate.

In some implementations, a width of the light transmitting area is less than about one millimeter.

In some implementations, the electronic device further includes:

a dustproof net detachably coupled to the casing; the dustproof net is arranged on a side of the casing far away from the indicating structure;

the dustproof net and the light transmitting area of casing jointly define the light exiting surface of the indicating structure.

DESCRIPTION OF EMBODIMENTS

Figure 1:
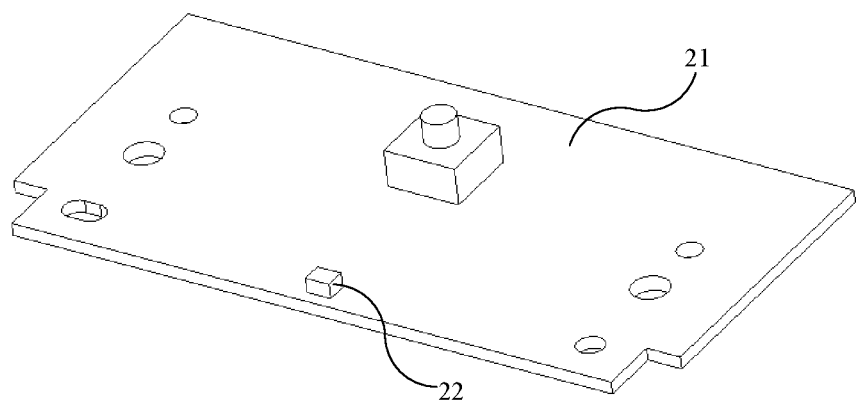
FIG. 1 is a schematic structural diagram of a light emitting component in an electronic device according to an embodiment of the present disclosure.

In order that those skilled in the art will better understand technical solutions of the present disclosure, the following detailed description is given with reference to the accompanying drawings and the specific implementations.

The present disclosure will be described in more detail below with reference to the accompanying drawings. In the various figures, like elements are identified with the same or similar reference numerals. For purposes of clarity, the various features in the drawings are not drawn to scale. Moreover, some well-known elements may not be shown in the drawings. The shapes and sizes of the components in the drawings are not to scale, and are shown merely to facilitate an understanding of contents of the embodiments of the present disclosure.

Numerous specific details of the present disclosure, such as structures, materials, dimensions, processing techniques and technologies of the components, are set forth in the following description in order to provide a more thorough understanding of the present disclosure. However, as will be understood by those skilled in the art, the present disclosure may be practiced without these specific details.

Unless defined otherwise, technical or scientific terms used herein shall have the ordinary meaning as understood by one of ordinary skill in the art to which the present disclosure belongs. The use of "first", "second," and the like in the present disclosure is not intended to indicate any order, quantity, or importance, but rather is used to distinguish one element from another. Also, the use of the terms "a", "an," or "the" and similar referents do not denote a limitation of quantity, but rather denote the presence of at least one. The word "include" or "comprise", and the like, means that the element or item appearing in front of the word includes the element or item listed after the word, and the equivalent thereof, but does not exclude other elements or items. The terms "coupling" or "coupled" and the like are not restricted to physical or mechanical connections, but may include electrical connections, whether direct or indirect. Positional relationship terms "on", "left", and the like are used only to indicate relative positional relationships, which may change accordingly when the absolute position of the object being described changes. The word "fixedly coupled" defines that two components are coupled while being relatively fixed in position, but are not necessarily non-detachable, and may be detachably coupled.

The embodiments of the present disclosure are not limited to the embodiments shown in the drawings, but include modifications of configurations formed based on a manufacturing process. Thus, the area/region illustrated in the figures has schematic properties, and the shape of the area/region shown in the figures illustrates a specific shape of area/region of an element, but is not limiting.

The indicator light in the related art has defects of poor light effect and high power. Specifically, the effect of the currently used indicator light is mostly a bright spot, the light effect is not uniform, and the overall effect is poor. On this basis, in order to achieve the uniformity of light effect, a plurality of indicator lights on the market each adopt a plurality of LEDs (light emitting diodes) for compensating light, which results in a higher standby power, and the indicator lights are high in brightness and dazzling under the condition that the lamps are turned off indoors at night, and easily cause light pollution.

Therefore, an electronic device, which functions an indicator light having a uniform light effect, is provided.

As shown in FIGS. 1 to 8, an embodiment of the present disclosure provides an electronic device, including: a casing 1 and an indicating structure fixedly coupled to the casing 1. A main body of the casing 1 is provided with a light transmitting area 1A; a light exiting surface of the indicating structure corresponds to the light transmitting area 1A. The indicating structure includes: a light emitting component and a light guide component which are fixedly coupled to each other; the light guide component is configured to scatter light emitted by the light emitting component and then emit the scattered light.

In the electronic device provided by the embodiment of the present disclosure, an operating state of the electronic device can be indicated through the indicating structure. When the indicating structure operates, light emitted by the light emitting component is scattered by the light guide component and then is emitted from the light transmitting area 1A, so that an indicating function is realized. Compared with technical solution in which light emitted by a light source is directly used for indicating, in the embodiment of the present disclosure, the light emitted by the light emitting component is scattered by the light guide component so that a point light source is converted into a surface light source which emits light more uniformly, improving the uniformity of light effect of the indicating structure of the electronic device. Furthermore, since the structure based on the embodiment of the present disclosure can effectively achieve the uniformity of light effect of the indicating structure, there is no need to use multiple point light sources to achieve uniform lighting effect, so that the preparation cost and the power consumption cost of the indicating structure can be reduced, and the light pollution caused by higher brightness can be avoided.

In some implementations, the electronic device provided in the embodiment of the present disclosure may be a television, a computer, or any other electronic device that requires an indicating structure. Depending on the actual type of the electronic device and the number of operating states thereof, the light emitting component may have one or more different light emitting states (e.g., normally lighting, flashing, etc.), light emitting colors, and so on.

As shown in FIGS. 1 to 5, the indicating structure includes the light emitting component and the light guide component. The light emitting component is configured to emit light, and the light guide component is configured to conduct and emit the light emitted by the light emitting component, so that an overall lighting effect of the indicating structure is uniform.

The light guide component is fixedly coupled to the light emitting component; the light guide component has a light incident surface 31A and a light exiting surface 31B; a light mixing region is arranged between the light incident surface 31A of the light guide component and the light emitting component; a light emitting element 22 (i.e., a light source) of the light emitting component directly faces the light incident surface 31A of the light guide component, and the light emitted from the light emitting element 22 is incident on the light incident surface 31A of the light guide component through the light mixing region and exits from the light exiting surface 31B. The light is emitted to the light guide component after being mixed in the light mixing region, and is scattered and conducted inside the light guide component to form uniformly distributed light and is emitted from the light exiting surface 31B of the light guide component, so that the point light emitting element 22 can be converted into the surface light emitting component 22 with uniform lighting effect, and the light emitting uniformity of the indicating structure is improved.

Figure 7:
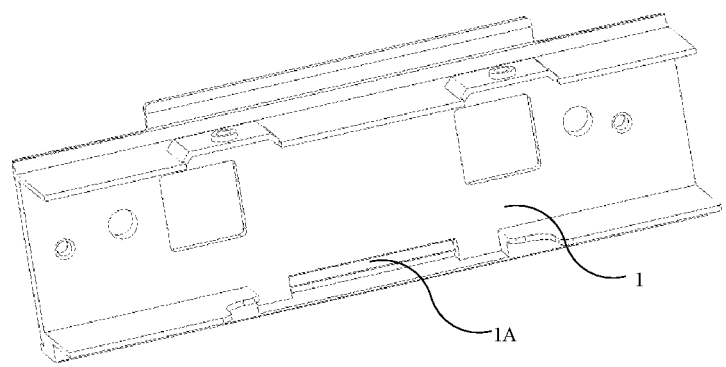
FIG. 7 is a schematic structural diagram of a casing in an electronic device according to an embodiment of the present disclosure.
Figure 8:
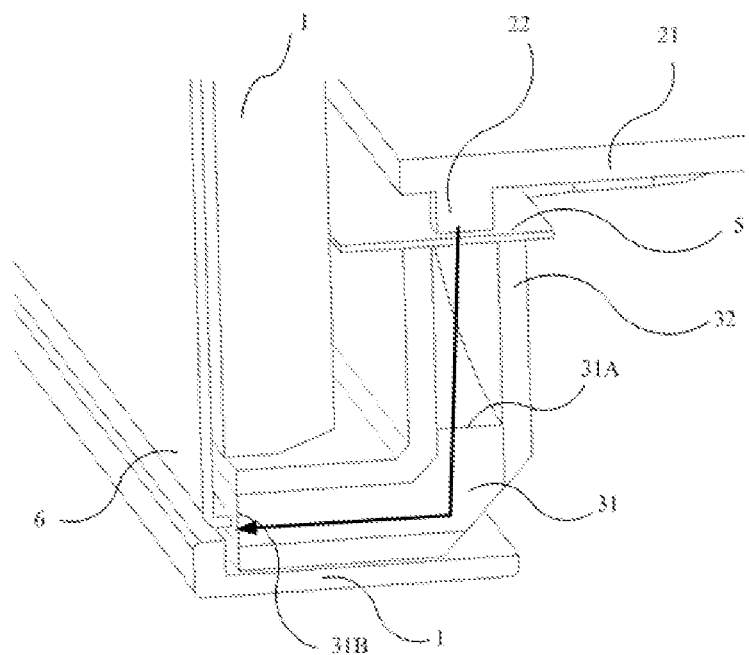
FIG. 8 is a partial schematic structure diagram of an electronic device according to an embodiment of the present disclosure.

As shown in FIGS. 7 and 8, in the embodiment of the present disclosure, the casing 1 may be a plate-shaped structure, and a screw hole and/or a thermal melting point may be disposed on the casing 1, so that the indicating structure can be fixed by the screw hole and/or the thermal melting point. The light exiting surface 31B of the indicating structure corresponds to the light transmitting area 1A of the casing 1, and the light emitted from the light emitting component is emitted through the light transmitting area 1A to indicate the operating states of the electronic device. The light transmitting area 1A of the casing 1 may be made of a transparent material, or may be an opening directly formed on the main body of the casing 1 to implement a light transmitting function.

In the embodiment of the present disclosure, as shown in FIG. 1, the light emitting component may include: a supporting substrate 21 and the light emitting element 22. The supporting substrate 21 is fixedly coupled to the light guide component; the light emitting element 22 is fixedly disposed on a surface of the supporting substrate 21 proximal to the light guide component. The light emitting element 22 may include an LED, for example, may include a 4014 LED. The LED has a higher light emitting brightness and a low cost, and the related production technology is mature, thereby not causing a production pressure.

Specifically, the supporting substrate 21 in the light emitting component may be a flat plate structure, and the light emitting element 22 is fixedly disposed on a surface thereof. It is understood that the light emitting brightness of the indicating structure does not need to be too high in order to avoid light pollution in dark scenes such as nighttime environments. Meanwhile, since the LED has a higher light emitting brightness, only a few or even a single LED is needed in the indicating structure to meet the brightness requirement of the indicating structure. Since the light emitting element 22 has a relative small volume, the light emitting element 22 and the light guide component may be fixedly coupled by the supporting substrate 21 in the embodiment of the present disclosure, that is, the light emitting element 22 may be fixed on the supporting substrate 21, and the supporting substrate 21 is fixedly coupled to the light guide component.

Figure 2:
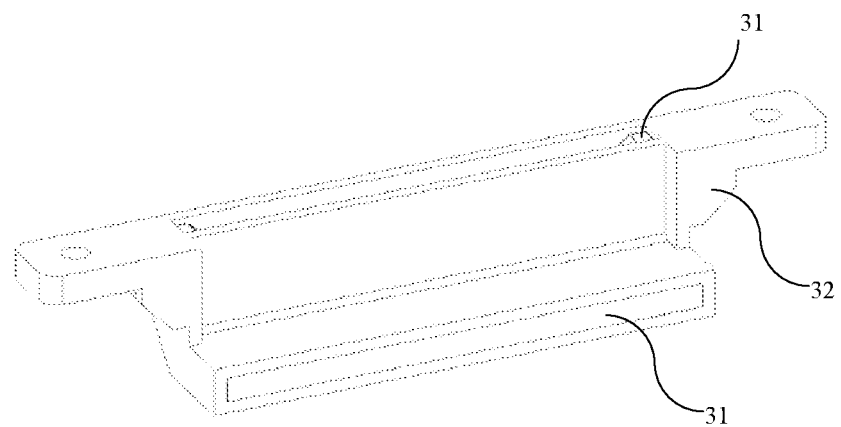
FIG. 2 is a schematic structural diagram of a light guide component in an electronic device according to an embodiment of the present disclosure.
Figure 3:
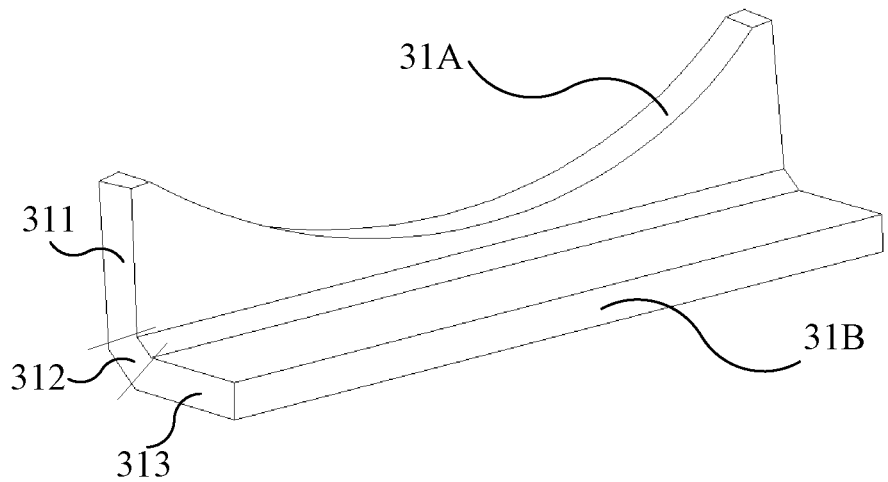
FIG. 3 is a schematic structural diagram of a light guide plate in an electronic device according to an embodiment of the present disclosure.

As shown in FIGS. 2 and 3, the light guide component may include: a light guide plate 31 and a coupling piece 32. The light guide plate 31 has a light incident surface and a light exiting surface, and the light incident surface is not adjacent to the light exiting surface. The coupling piece 32 is configured to realize a fixed coupling between the light guide plate 31 and the light emitting component. Specifically, the light emitting component may be fixedly coupled to the coupling piece 32, and the coupling piece 32 is fixedly coupled to the light guide plate 31.

In some implementations, as shown in FIG. 8, the coupling piece 32 may include a cylindrical structure having a first opening and a second opening; the light guide plate 31 is embedded in the coupling piece 32, the first opening exposes the light incident surface of the light guide plate 31, and the second opening exposes the light exiting surface of the light guide plate 31; an end of the coupling piece 32 where the first opening is located is fixedly coupled to the light emitting component; the light emitted by the light emitting component is incident on the light incident surface of the light guide plate 31 through the first opening; an end of the coupling piece 32 where the second opening is located is fixedly coupled to the casing 1, and the second opening corresponds to the light transmitting area 1A. That is, the coupling piece 32 is disposed around the light guide plate 31 and exposes the light incident surface and the light exiting surface of the light guide plate 31. Meanwhile, the coupling piece 32 covers other regions of the light guide plate 31, thereby ensuring that the light emitted from the light emitting component only enters into the light guide plate 31 from the light incident surface thereof and is emitted from the light exiting surface of the light guide plate 31.

The first opening of the coupling piece 32 may be formed in various shapes, such as a smile face shape, a straight line shape, a wavy line shape, or the like. In some implementations, a width of the light exiting surface of the light guide component provided in the embodiment of the present disclosure is less than about 1 mm, so as to reduce a light exiting area as much as possible under a condition that an indication function can be implemented, thereby reducing light pollution in a night environment or the like.

It is understood that the light guide plate 31 is generally a transparent structure. In the embodiment of the present disclosure, a material of the coupling piece 32 may include a light shielding material. That is, the coupling piece 32 may simultaneously serve as a light shielding structure. In the embodiment of the present disclosure, the light guide plate 31 is wrapped by the coupling piece 32 made of the light shielding material and disposed at the periphery of the light guide plate 31, so as to prevent light leakage during operation of the indicating structure. In the embodiment of the present disclosure, the light leakage is reduced as much as possible by the light shielding effect of the coupling piece 32, which is beneficial to ensuring the overall light emitting efficiency of the indicating structure, so that the light emitting element 22 with a low power consumption can be selected under the condition of satisfying the indicating light effect, and the power consumption cost is reduced.

In the embodiment of the present disclosure, the light guide plate 31 may include a transparent light guide plate, and a specific material thereof may be a transparent PC (Polycarbonate) material. The coupling piece 32 may include a black coupling piece, and a specific material thereof may be a black PC+ABS (ABS engineering plastic; engineering plastic alloy) material.

In the embodiment of the present disclosure, as shown in FIG. 8, a light mixing region configured to mix light is provided between the light guide component and the light emitting component, specifically, the light guide plate 31 may be embedded in the coupling piece 32, and at least a part of the light incident surface of the light guide plate 31 and the end of the coupling piece 32 where the first opening corresponding to the light incident surface is located are spaced apart by a certain distance, so as to form a light mixing space (light mixing region) in the coupling piece 32, so as to fully and uniformly mix light emitted by the light emitting element 22 as much as possible. The supporting substrate 21 of the light emitting component may be directly disposed at the end of the coupling piece 32 where the first opening is located, and is fixedly coupled to the coupling piece 32, so that the light emitting element 22 corresponds to the first opening of the coupling piece 32, thereby ensuring that the light of the light emitting component can be emitted into the light guide plate 31, and simultaneously reserving the light mixing space.

In some implementations, the light incident surface 31A of the light guide plate 31 in the embodiment of the present disclosure includes a concave arc surface; a space is provided between the light emitting component and at least a part of the light incident surface 31A of the light guide plate 31. As shown in FIG. 3, the light guide plate 31 may have a plate-shaped structure (a bent plate-shaped structure in FIG. 3), and an end surface thereof is the concave light incident surface 31A. The light guide plate 31 is integrally embedded in the coupling piece 32, and an end surface of the first opening of the coupling piece 32 corresponding to the light incident surface 31A is a planar structure, so that an end of the light guide plate 31 where the light incident surface 31A is located is recessed in the coupling piece 32. That is, the light incident surface 31A of the light guide plate 31 and a part of side walls of the coupling piece 32 together define a space, so that the light emitting element 22 is spaced from the light incident surface 31A of the light guide plate 31 by a certain distance, and the space can be used as the light mixing region.

The supporting substrate 21 of the light emitting component may be directly and fixedly coupled to the end of the coupling piece 32 where the first opening is located, and meanwhile, a surface of the supporting substrate 21 provided with the light emitting element 22 faces the light guide component, and the light emitting element 22 corresponds to the first opening of the coupling piece 32. Therefore, when the indicating structure operates, a certain distance exists between the light emitted from the light emitting element 22 and the light incident surface 31A of the light guide plate 31, and the light emitted from the light emitting element 22 can be sufficiently mixed before reaching the light incident surface 31A of the light guide plate 31, and then the mixed light is transmitted through the light guide plate 31, and uniform light is emitted from the light exiting surface 31B of the light guide plate 31.

It is understood that even if the end surface of the first opening is not a planar structure but a curved surface structure, a certain space may be reserved between the end surface of the first opening and the end surface of the light incident surface 31A by setting the curvature of the end surface of the first opening to form the light mixing region. The specific structure of the end surface of the first opening is not limited in the embodiment of the present disclosure. The end surface of the first opening is a surface formed by edges of an end of the first opening, and may be a plane or a curved surface, which is not specifically limited in the embodiment of the present disclosure.

In some implementations, the light guide plate 31 has a bent structure, as shown in FIG. 3, the light guide plate 31 may include a first light guide part 311, a second light guide part 313, and a coupling part 312 configured to couple the first light guide part 311 to the second light guide part 313; the light emitted from the light emitting component enters the coupling part 312 through the first light guide part 311, is totally reflected in the coupling part 312, then enters the second light guide part 313, and is emitted from the second light guide part 313. That is, as shown in FIG. 3, the light guide component may have a non-flat structure, but a bent structure, and an angle of the light entering the light guide component is different from an angle of the light exiting the light guide component. As shown in FIG. 2, at least an outer coupling surface of the coupling part 312 of the light guide plate 31 (the surface of the coupling part 312 that is away from a bending direction of the light guide plate 31) is an inclined surface and forms certain angles with respect to the first light guide part 311 and the second light guide part 313, so that the light emitted from the first light guide part 311 is totally reflected as much as possible when passing through the coupling part 312 and is incident on the second light guide part 313. With such structural design, the demand of different electronic device to the shape of the indicating structure in the related art can be satisfied better, and the loss of light can be minimized simultaneously. It should be noted that the overall structure of the light guide plate 31 or the light guide component provided in the embodiment of the present disclosure is not limited to a bent plate structure, and may be a flat plate structure or other structures, which is not particularly limited in the embodiment of the present disclosure, as long as the light guide plate 31 is capable of transmitting and emitting light. It is understood that, depending on an extension length of the coupling part 312, an inner coupling surface of the coupling part 312 (the surface of the coupling part 312 proximal to the bending direction of the light guide plate) may also be an inclined surface, and forms certain angles with respect to the first light guide part 311 and the second light guide part 313, so that the light emitted from the first light guide part 311 can be totally reflected as much as possible when passing through the coupling part 312.

Figure 4:
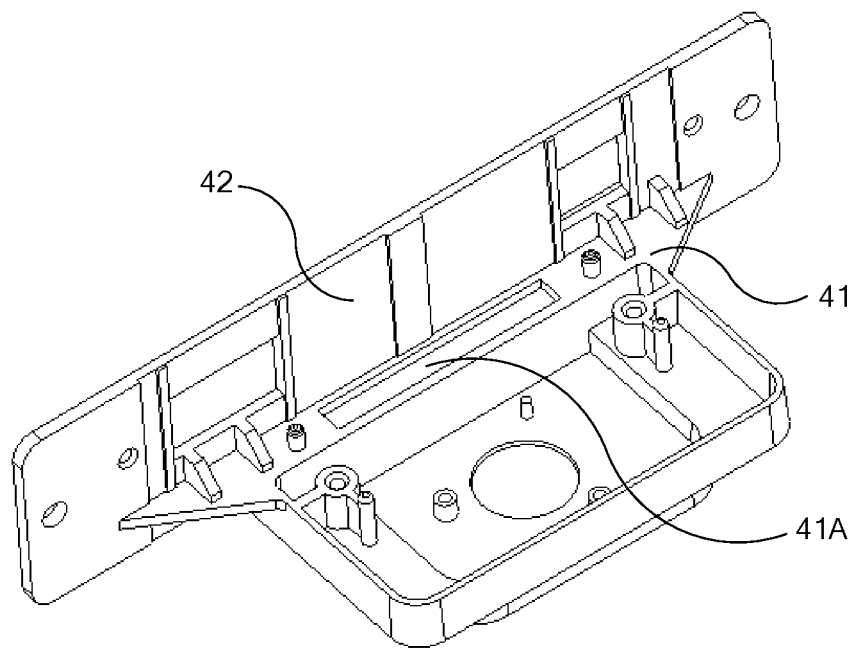
FIG. 4 is a schematic structural diagram of a coupling bracket in an electronic device according to an embodiment of the present disclosure.
Figure 5:
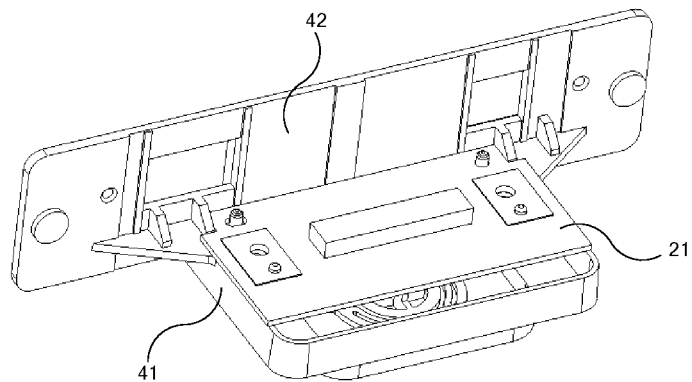
FIG. 5 is a schematic diagram illustrating coupling between a light emitting component and a coupling bracket in an electronic device according to an embodiment of the present disclosure.
Figure 6:
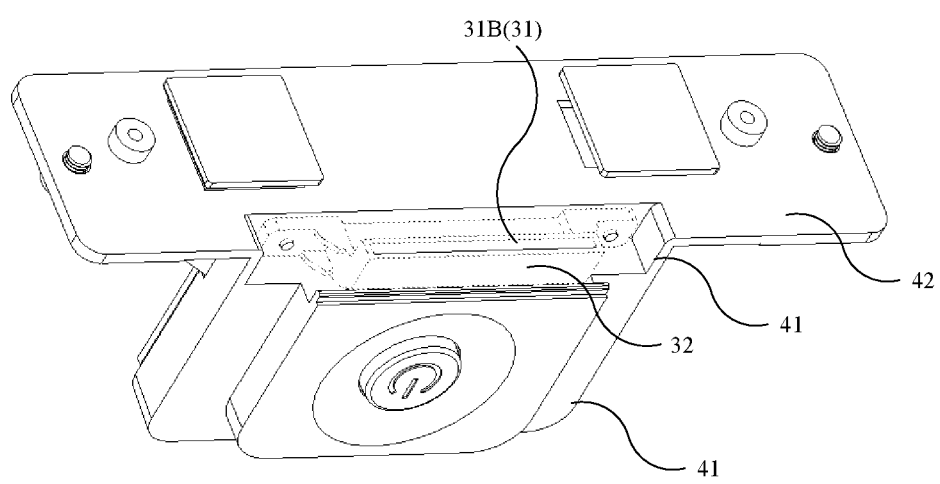
FIG. 6 is a schematic diagram illustrating coupling between a light guide component and a coupling bracket in an electronic device according to an embodiment of the present disclosure.

In some implementations, the light emitting component and the light guide component in the embodiment of the present disclosure may be fixedly coupled by a coupling bracket; as shown in FIGS. 4 to 6, the coupling bracket includes a first coupling plate 41, the first coupling plate 41 has a coupling opening 41A, and the coupling opening 41A corresponds to the light incident surface of the light guide component; the supporting substrate 21 of the light emitting component is fixedly coupled to the first coupling plate 41, and an orthographic projection of the light emitting element 22 on the supporting substrate 21 falls into an orthographic projection of the coupling opening 41A on the supporting substrate 21; the light guide component is fixedly coupled to a side of the first coupling plate 41 away from the light emitting component, and an orthographic projection of the light incident surface of the light guide element on the supporting substrate 21 covers the orthographic projection of the coupling opening 41A on the supporting substrate 21.

As shown in FIG. 5, the light guide component and the light emitting component may be respectively fixed on two sides of the first coupling plate 41, and the light emitted from the light emitting component can enter the light incident surface of the light guide component through the coupling opening 41A of the first coupling plate 41. The light guide component and the first coupling plate 41 may be fixedly coupled by welding. In some implementations, the welding means may be heat welding. The light emitting component and the first coupling plate 41 may also be fixedly coupled by welding. As shown in FIGS. 5 and 6, the first coupling plate 41 may be respectively provided with thermal melting points on both sides thereof, and the light emitting component and the light guide component may be provided with openings corresponding to the thermal melting points. When the indicating structure is formed by assembling, the light emitting component is matched with the first coupling plate 41 according to corresponding positions of the thermal melting points and the openings of the light emitting component corresponding to the thermal melting points, and a thermal melting process is performed at the positions of the thermal melting points, so that the light emitting component is fixed with the first coupling plate 41. Specifically, in the embodiment of the present disclosure, an opening corresponding to the thermal melting point may be formed in the supporting substrate 21 of the light emitting component. It is understood that a fixing manner for fixing the light guide component to the first coupling plate 41 may refer to the fixing manner for fixing the light emitting component to the first coupling plate 41, and the details are not repeated herein. It should be noted that a size of the opening corresponding to the thermal melting point should match the thermal melting point to ensure the fixing effect.

In some implementations, the coupling bracket in the embodiment of the present disclosure further includes a second coupling plate 42. As shown in FIGS. 4 to 6, the second coupling plate 42 may be disposed at an end of the first coupling plate 41, and an angle may be formed between a plane where the second coupling pate 42 is located and a plane where the first coupling plate 41 is located. The indicating structure may be coupled to the casing 1 by the second coupling plate 42. In some implementations, the second coupling plate 42 is located on a side of the first coupling plate 41 away from the light emitting component. Specifically, the second coupling plate 42 may be disposed perpendicular to the first coupling plate 41 and parallel to the casing 1. The second coupling plate 42 may be fixed to the casing 1 by thermal melting.

In some implementations, as shown in FIG. 8, the electronic device provided by an embodiment of the present disclosure may further include: a dustproof net 6 detachably coupled to the casing 1; the dustproof net 6 is arranged on a side of the casing 1 away from the indicating structure; the dustproof net 6 and the light transmitting area 1A of the casing 1 jointly define the light exiting surface of the indicating structure.

In some implementations, the dustproof net 6 is made of a metal material, such as a stainless steel material, and particularly, SUS403 stainless steel may be used. Under the condition that the dustproof net 6 is made of the stainless steel material, the dustproof net 6 is good in overall strength, convenient to be processed, not prone to be deformed, simple in surface treatment process and easy to color. In the embodiment of the present disclosure, the light exiting surface (i.e., the light transmitting area 1A) of the casing 1 may be an opening. The dustproof net 6 is disposed on a side of the casing 1 away from the indicating structure (e.g., the left side of the casing 1 shown in FIG. 8), and the dustproof net 6 may be bent in a single direction by about 1 mm to cooperate with the coupling opening 41A to define the light exiting surface with a width of about 0.3 mm. The overall light effect of the indicating structure of the electronic device is made to be a superfine effect with the width of about 0.3 mm, and light pollution under a dark environment is avoided.

In some implementations, the indicating structure provided by the embodiment of the present disclosure may further include: a diffusion plate 5. As shown in FIG. 8, the diffusion plate 5 may be disposed between the light emitting component and the light guide component, and is configured to atomize the light emitted from the light emitting component, so as to further enhance the light emitting uniformity of the indicating structure. Specifically, the diffusion plate 5 may be disposed at an end of the light guide component proximal to the light emitting component, and the light emitted from the light emitting component is atomized by the diffusion plate 5 and then enters the light guide component. In some implementations, the diffusion plate 5 may be fixedly coupled to the light guide component by thermal melting, so that the indicating structure is fixed as a whole.

It should be understood that the shape of the light exiting surface in the embodiment of the present disclosure may be various shapes, for example, it may be a rectangle, in such case, the width of the light exiting surface may refer to a distance between two long sides thereof, but the present disclosure is not limited thereto, and the width of the light exiting surface may be correspondingly a size of the light exiting surface in any direction in a plane where the light exiting surface is located according to the shape of the light exiting surface, which is not particularly limited by the present disclosure and may be set by a person skilled in the art as required.

Similarly, the shape of the light transmitting area in the embodiment of the present disclosure may be various shapes, for example, it may be a rectangle, in such case, the width of the light transmitting area may refer to the distance between two long sides thereof, but the present disclosure is not limited thereto, and the width of the light transmitting area may be correspondingly the size of the light transmitting area in any direction in a plane where the light transmitting area is located according to the shape of the light transmitting area, which is not particularly limited by the present disclosure and may be set by a person skilled in the art as required.

It will be understood that the above implementations are merely exemplary implementations employed to illustrate the principles of the present disclosure, and the present disclosure is not limited thereto. It will be apparent to those skilled in the art that various changes and modifications can be made therein without departing from the spirit and scope of the present disclosure, and these changes and modifications are to be considered within the scope of the present disclosure.

The invention claimed is:

1. An electronic device, comprising:
  a casing, a main body of which is provided with a light transmitting area;
  an indicating structure comprising a light emitting component and a light guide component which are fixedly coupled, and a diffusion plate disposed between the light emitting component and the light guide component; the diffusion plate is configured to atomize light emitted by the light emitting component, and the light guide component is configured to scatter the light atomized by the diffusion plate and then emit the light scattered;
  the indicating structure is fixedly coupled to the casing, and a light exiting surface of the indicating structure corresponds to the light transmitting area.

2. The electronic device of claim 1, wherein the light guide component has a light incident surface and a light exiting surface; a light mixing region is arranged between the light incident surface of the light guide component and the light emitting component; the light emitted by the light emitting component is incident into the light incident surface of the light guide component through the light mixing region and is emitted from the light exiting surface.

3. The electronic device of claim 2, wherein the light guide component comprises:
a light guide plate provided with the light incident surface and the light exiting surface, and the light incident surface of the light guide plate is not adjacent to the light exiting surface of the light guide plate; the light emitted by the light emitting component is incident through the light incident surface of the light guide plate and is emitted from the light exiting surface of the light guide plate; and
a coupling piece fixedly coupled to the light guide plate; the light emitting component is coupled to the coupling piece.

4. The electronic device of claim 3, wherein the coupling piece comprises a cylindrical structure having a first opening and a second opening;
the light guide plate is embedded in the coupling piece, the light incident surface of the light guide plate is exposed by the first opening, and the light exiting surface of the light guide plate is exposed by the second opening;
an end of the coupling piece where the first opening is located is fixedly coupled to the light emitting component; the light emitted by the light emitting component is incident into the light incident surface of the light guide plate through the first opening;
an end of the coupling piece where the second opening is located is fixedly coupled to the casing, and the second opening is correspondingly coupled to the light transmitting area.

5. The electronic device of claim 4, wherein the light incident surface of the light guide plate comprises a concave arc surface; and a space is formed between the light emitting component and at least part of the light incident surface of the light guide plate.

6. The electronic device of claim 3, wherein the light guide plate is of a bent structure, and the light guide plate comprises a first light guide part, a second light guide part, and a coupling part configured to couple the first light guide part to the second light guide part; the light emitted from the light emitting component is incident into the coupling part through the first light guide part, is totally reflected by the coupling part, then is incident into the second light guide part, and is emitted from the second light guide part.

7. The electronic device of claim 4, wherein the light guide plate comprises a transparent light guide plate;
a material of the coupling piece comprises a light shielding material.

8. The electronic device of claim 1, wherein the light emitting component comprises a supporting substrate and a light emitting element;
the light emitting element is fixedly arranged on a surface of the supporting substrate proximal to the light guide component.

9. The electronic device of claim 8, wherein the light emitting component is fixedly coupled to the light guide component through a coupling bracket;
the coupling bracket comprises a first coupling plate, the first coupling plate is provided with a coupling opening, and the coupling opening corresponds to the light incident surface of the light guide component;
the supporting substrate of the light emitting component is fixedly coupled to the first coupling plate, and an orthographic projection of the light emitting element on the supporting substrate falls into an orthographic projection of the coupling opening on the supporting substrate;
an orthographic projection of the light incident surface of the light guide component on the supporting substrate covers the orthographic projection of the coupling opening on the supporting substrate.

10. The electronic device of claim 1, wherein a width of the light transmitting area is less than about 1 millimeter.

11. The electronic device of claim 1, further comprising:
a dustproof net detachably coupled to the casing; the dustproof net is arranged on a side of the casing away from the indicating structure;
the dustproof net and the light transmitting area of casing jointly define the light exiting surface of the indicating structure.

* * * * *